US011366374B2

United States Patent
Gwalani

(10) Patent No.: US 11,366,374 B2
(45) Date of Patent: Jun. 21, 2022

(54) APPARATUS FOR DETACHABLY MOUNTING FILTERS ONTO A LENS OF A PHOTOGRAPHIC DEVICE

(71) Applicant: FREEWELL INDUSTRY COMPANY LIMITED, Hong Kong (HK)

(72) Inventor: Hitesh Gopal Gwalani, Nagpur (IN)

(73) Assignee: FREEWELL INDUSTRY COMPANY LIMITED, Hong Kong (HK)

( * ) Notice: Subject to any disclaimer, the term of this patent is extended or adjusted under 35 U.S.C. 154(b) by 262 days.

(21) Appl. No.: 16/792,915

(22) Filed: Feb. 18, 2020

(65) Prior Publication Data

US 2020/0183255 A1  Jun. 11, 2020

(51) Int. Cl.
*G03B 17/14* (2021.01)
*H04N 5/225* (2006.01)
*G02B 7/14* (2021.01)
*G02B 7/02* (2021.01)

(52) U.S. Cl.
CPC ............ *G03B 17/14* (2013.01); *G02B 7/022* (2013.01); *H04N 5/2254* (2013.01)

(58) Field of Classification Search
CPC ...... G03B 17/14; G03B 11/00; G03B 17/566; G02B 7/022; G02B 7/006; G02B 7/02–16; G02B 5/281–283; G02B 5/205; G02B 5/20–289; H04N 5/2254
See application file for complete search history.

(56) References Cited

U.S. PATENT DOCUMENTS

| 2,953,970 | A | * | 9/1960 | Maynard | G03B 17/12 359/611 |
| 8,382,298 | B2 | * | 2/2013 | Guager | G03B 11/041 359/511 |
| 2010/0111519 | A1 | * | 5/2010 | Kobayashi | G03B 11/00 396/544 |
| 2010/0183292 | A1 | * | 7/2010 | Neiman | G03B 17/00 396/533 |
| 2014/0240854 | A1 | * | 8/2014 | Meng | G02B 7/006 359/738 |
| 2016/0091778 | A1 | * | 3/2016 | Kobayashi | G03B 17/565 359/892 |
| 2016/0216474 | A1 | * | 7/2016 | Kobayashi | G02B 7/006 |

(Continued)

FOREIGN PATENT DOCUMENTS

WO  WO-2016038875 A1 * 3/2016 ............... G02B 7/00

*Primary Examiner* — Abdelaaziz Tissire

(57) ABSTRACT

An apparatus for detachably mounting filters onto a lens of a photographic device is provided. The apparatus comprises of an adapter assembly and a filter assembly. The adapter assembly comprises a first main frame with a first threaded portion and a second threaded portion, and a first engagement member with magnets disposed towards the second threaded portion. The filter assembly comprises a second main frame with a third threaded portion, a filter, and a second engagement with magnets disposed towards the third threaded portion. The adapter assembly is configured to be received by the lens of the photographic device. The filter assembly is configured to be received by the adapter assembly. A lens cover provided with a ferro magnetic material may be configured to be received by the adapter assembly or the filter assembly.

12 Claims, 7 Drawing Sheets

(56) References Cited

U.S. PATENT DOCUMENTS

| | | | | |
|---|---|---|---|---|
| 2017/0336591 A1* | 11/2017 | Kobayashi | ............ | G03B 17/565 |
| 2018/0045908 A1* | 2/2018 | Huang | ................. | G03B 17/566 |
| 2018/0052332 A1* | 2/2018 | Meng | ................... | G03B 17/565 |
| 2018/0074281 A1* | 3/2018 | Huang | ................... | G02B 7/006 |
| 2018/0164600 A1* | 6/2018 | Huang | ................. | G02B 27/281 |
| 2019/0391357 A1* | 12/2019 | Kobayashi | ............. | G02B 7/006 |
| 2020/0019043 A1* | 1/2020 | Clark | ..................... | G02B 7/006 |
| 2020/0133104 A1* | 4/2020 | Madonia | ............. | G03B 17/566 |

* cited by examiner

APPARATUS FOR DETACHABLY MOUNTING FILTERS ONTO A LENS OF A PHOTOGRAPHIC DEVICE

BACKGROUND

Field of Invention

The disclosed subject matter relates to the field of photographic device. More particularly, but not exclusively, the subject matter relates to attachment of filters onto a lens of photographic devices.

Discussion of Prior Art

Photographic filters are basically customized glass employed to alter the characteristics of the light entering the camera lens, thereby allowing a photographer to get required shots. Filters have been in the industry for a long time now. However, filters available in market are ones with threads wherein the filter has to be screwed-in and screwed-out from the camera lens to mount and unmount, respectively.

The drawback with the threaded filters is that every time a filter is to be mounted on to the camera lens it has to be screwed-in, which is time consuming, and has to be done patiently as threads on both the mating parts should cooperate. Furthermore, in cases where multiple filters are to be stacked, each filter has to be subsequently screwed onto the preceding filter which in turn would take substantial amount of time.

In addition to the foregoing, the moment of capturing a perfect shot would have passed by the time the filters are mounted/unmounted on/off the camera lens.

Additionally, the chances of wear and tear of the threads on both the filters and the camera lens is high due to regular mounting and unmounting of filters on the camera lens. Furthermore, slightest defects in the threads would have adverse effect on photography since the filters are not properly positioned, and the chances of the filter falling off from the camera lens are also high.

In view of the foregoing, it is apparent that there is a need for an improved system for mounting/unmounting of filters on/off the camera lens.

SUMMARY

An embodiment provides an apparatus for detachably mounting filters onto a lens of a photographic device. The apparatus comprises of an adapter assembly and a filter assembly. The adapter assembly comprises of a first main frame. The first main frame comprises of a first threaded portion that define external threads for engagement of the first main frame with the lens of the photographic device, and a second threaded portion that define internal threads. The adapter assembly comprises of a first engagement member comprising a first set of one or more magnets disposed towards the second threaded portion. At least a portion of second threaded portion protruding over the first engagement member. The filter assembly comprises of a second main frame comprising a third threaded portion that define internal threads. A filter is received by the second main frame. The second main frame of the filter assembly comprises of a second engagement member disposed over the filter. The second engagement member comprises of a second set of one or more magnets disposed towards the third threaded portion. At least a portion of third threaded portion that protrudes over the second engagement member.

In another embodiment, a lens cover for mounting onto the adapter assembly or the filter assembly is provided. The lens cover defines a groove configured to receive a ferro magnetic material. The ferro magnetic material magnetically couples the lens cover to the first or the second set of one or more magnets.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1A:
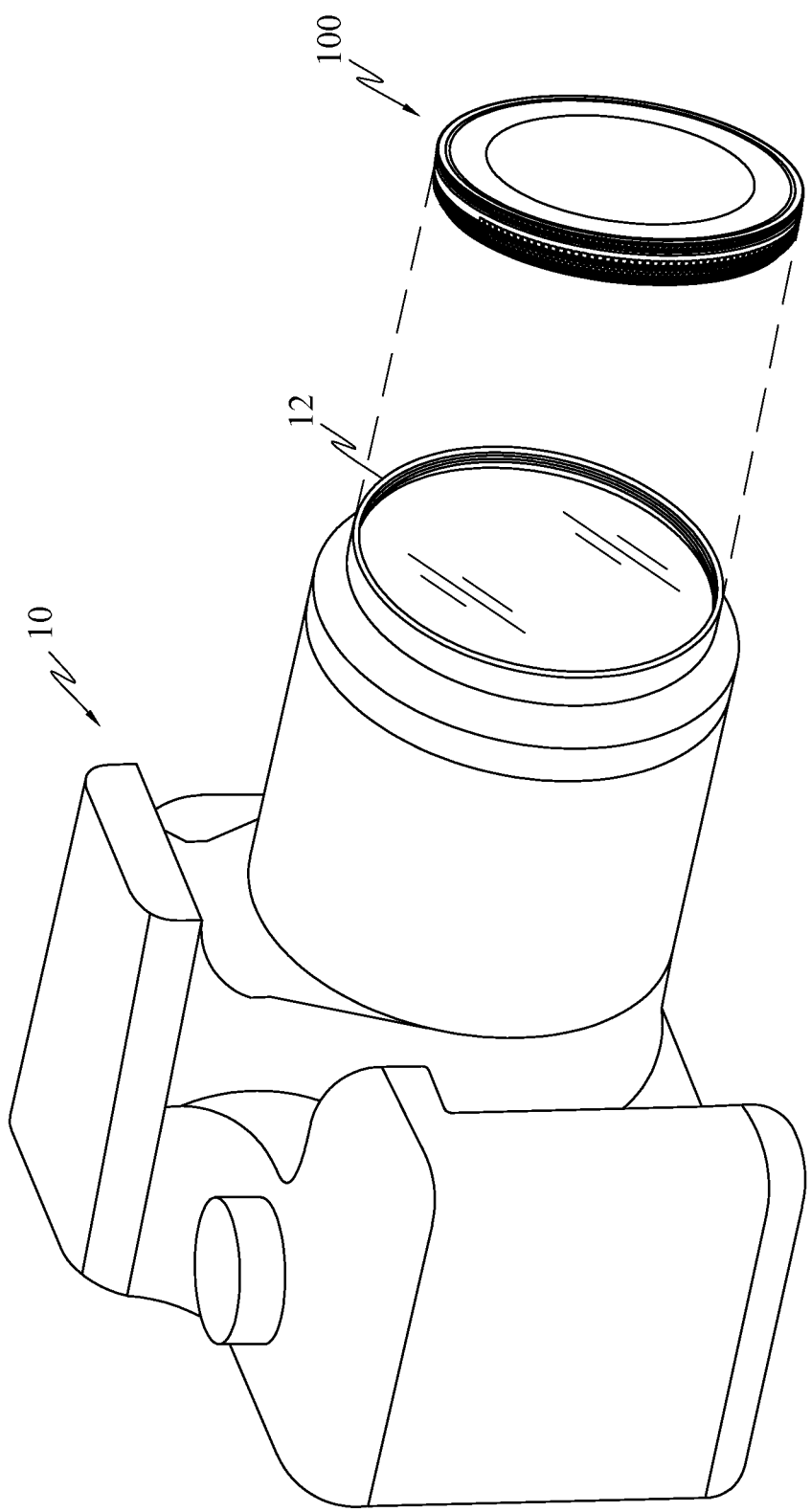
FIG. 1A illustrates an isometric view of an apparatus 100 configured to be mounted onto a lens 12 of a photographic device 10, in accordance with an embodiment.

Referring to FIG. 1A, an apparatus 100 is configured to be mounted onto a lens 12 of a photographic device 10. The apparatus 100 comprises an adapter assembly 102, a filter assembly 104 and a lens cover 106, in accordance with an embodiment.

Figure 1B:
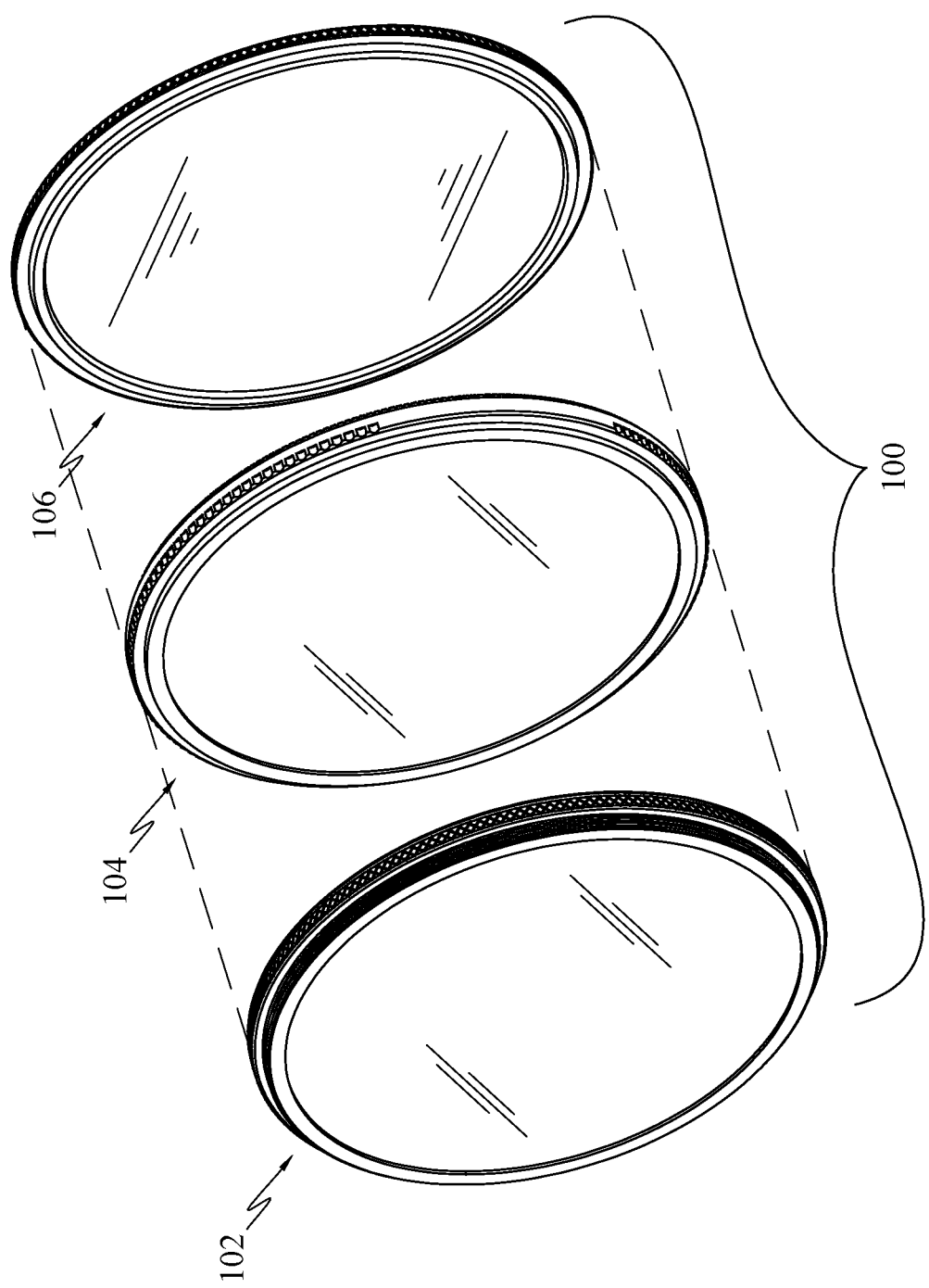
FIG. 1B illustrates an exploded view of the apparatus 100, in accordance with an embodiment.

FIG. 1B illustrates an exploded view of the apparatus 100 with the adapter assembly 102, the filter assembly 104 and the lens cover 106 in sequence from left to right, to be mounted onto the lens 12 of the photographic device 10, in accordance with an embodiment.

Figure 2A:
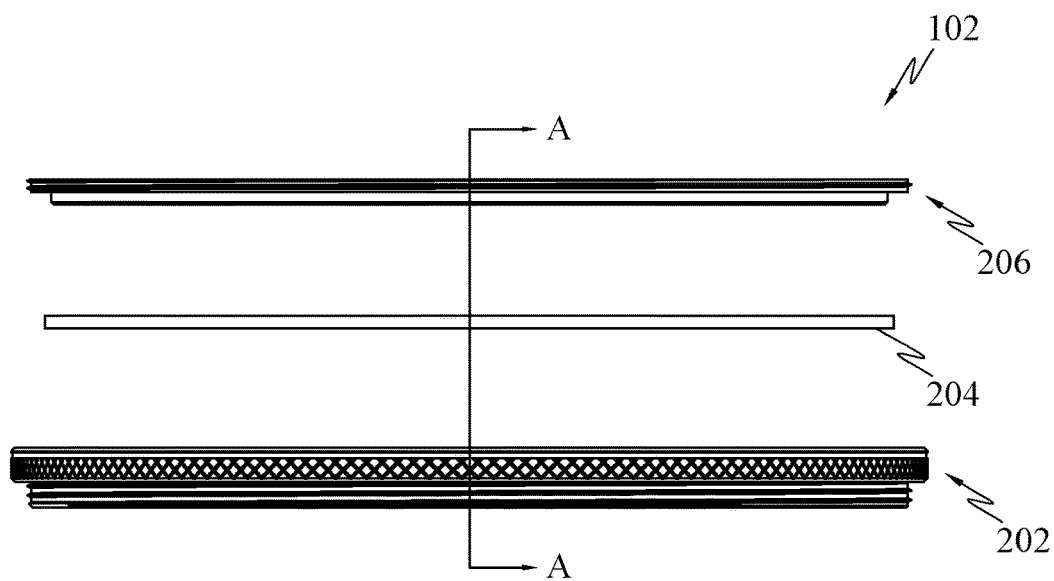
FIG. 2A illustrates an exploded side view of an adapter assembly 102 of the apparatus 100, in accordance with an embodiment.
Figure 2B:
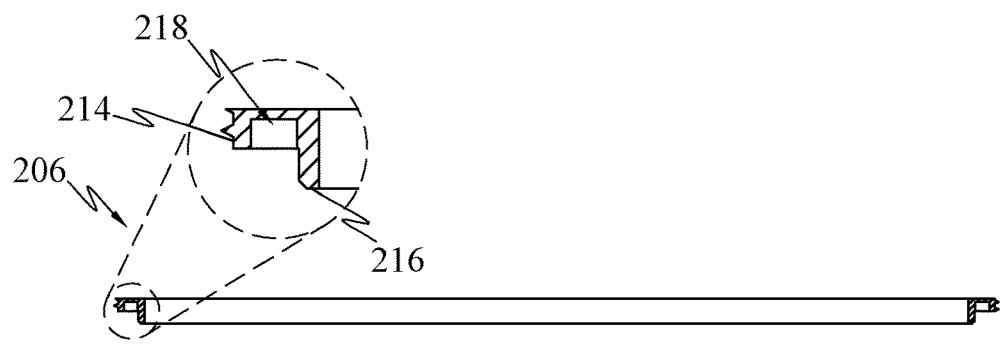
FIG. 2B illustrates cross section of the exploded view of the adapter assembly 102 taken along the line A-A, in accordance with an embodiment.
Figure 2B:
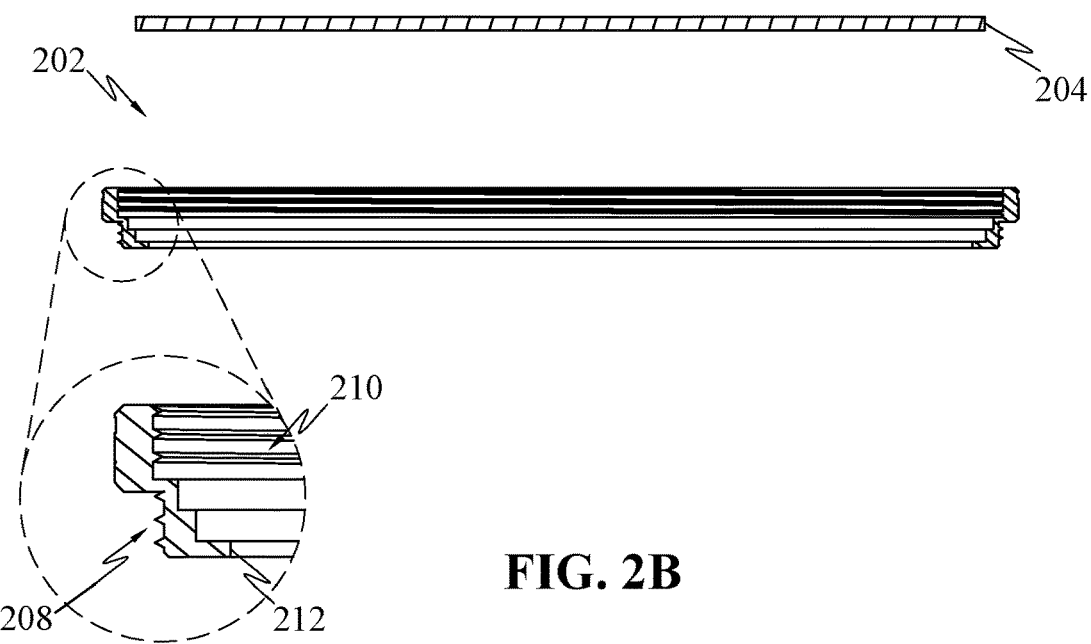
Figure 2C:
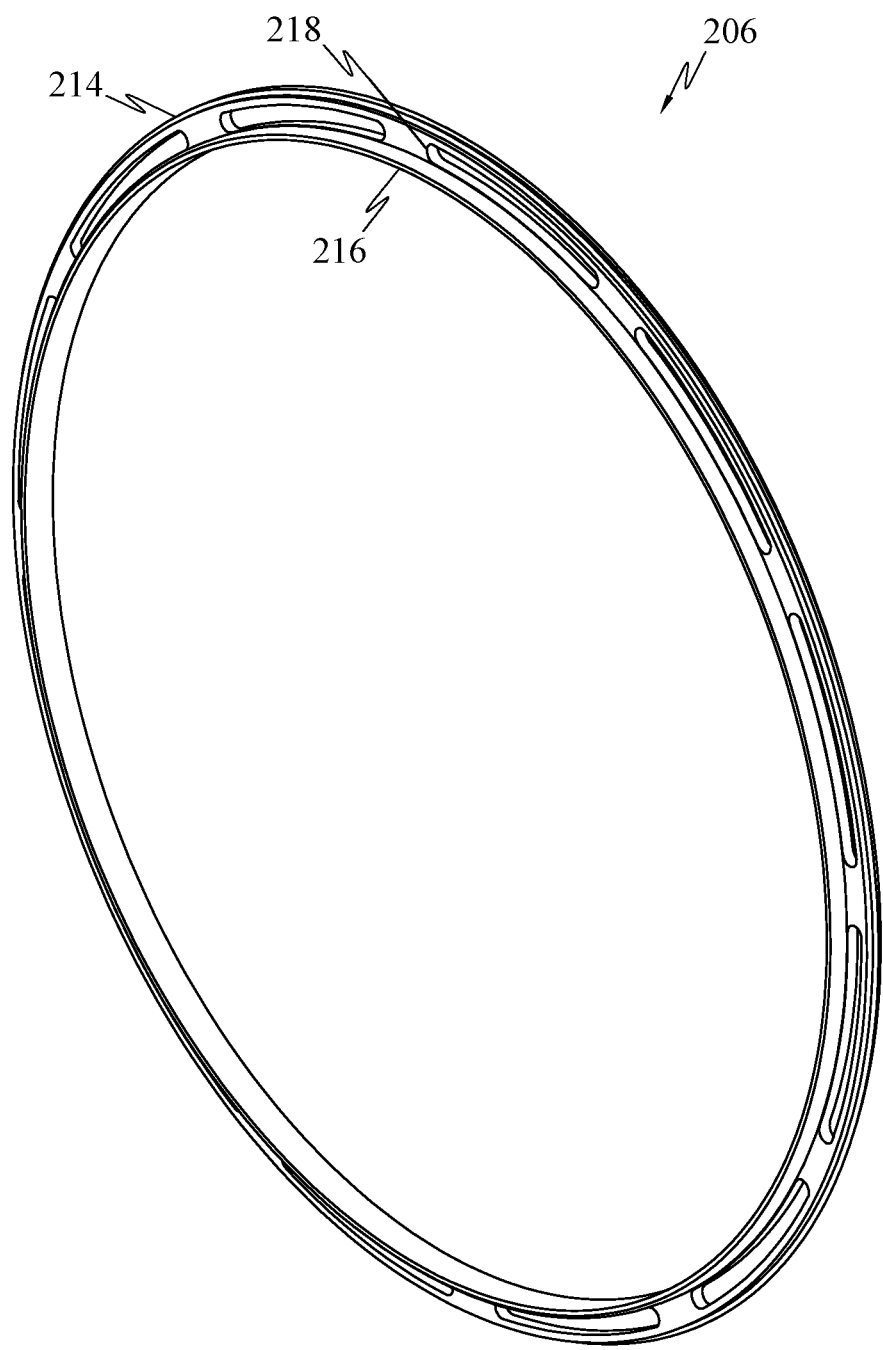
FIG. 2C illustrates isometric view of a first engagement member 206 of the adapter assembly 102, in accordance with an embodiment.

Referring to FIGS. 2A-2C, the adapter assembly 102 may comprise a first main frame 202, a first engagement member 206 and a first filter 204, in accordance with an embodiment. The first main frame 202 comprises of a first threaded portion 208 defining external threads. The first main frame 202 comprises of a second threaded portion 210 defining internal threads. The first main frame 202 may further comprise a first structure 212 protruding radially inwards. The second threaded portion 210 may be stacked over the first threaded portion 208.

In an embodiment, the first engagement member 206 comprises of a first leg 214 and a second leg 216, wherein at least one slot 218 may be defined between the first leg 214 and the second leg 216. The first engagement member 206 comprises of a first set of one or more magnets (not shown in figures.). The first set of one or more magnets may be configured to be received by the slot 218 defined between the first leg 214 and the second leg 216. The first set of one or more magnets may be engaged within the slot 218 by any of know adhesives. The first leg 214 of the first engagement member 206 comprises of external threads.

In an embodiment, the first filter 204 may be configured to be received over the first structure 212 of the first main frame 202 that protrude radially inwards. The first filter 204 may rest on the first structure 212. The external threads on the first leg 214 of the first engagement member 206 may be configured to be received by the second threaded portion 210 of the first main frame 202 of the adapter assembly 102, thereby engaging the first engagement member 206 onto the first main frame 202. The second leg 216 of the first engagement member 206 extend towards the first filter 204 and may be configured to limit the displacement of the first filter 204. The first main frame 202 comprises of at least a portion of the second threaded portion 210 protruding over the first engagement member 206 (refer FIG. 5B).

In an embodiment, the first filter 204 in the adapter assembly 102 may be replaced by disengaging the first engagement member 206 from the first main frame 202 of the adapter assembly 102.

Figure 3A:
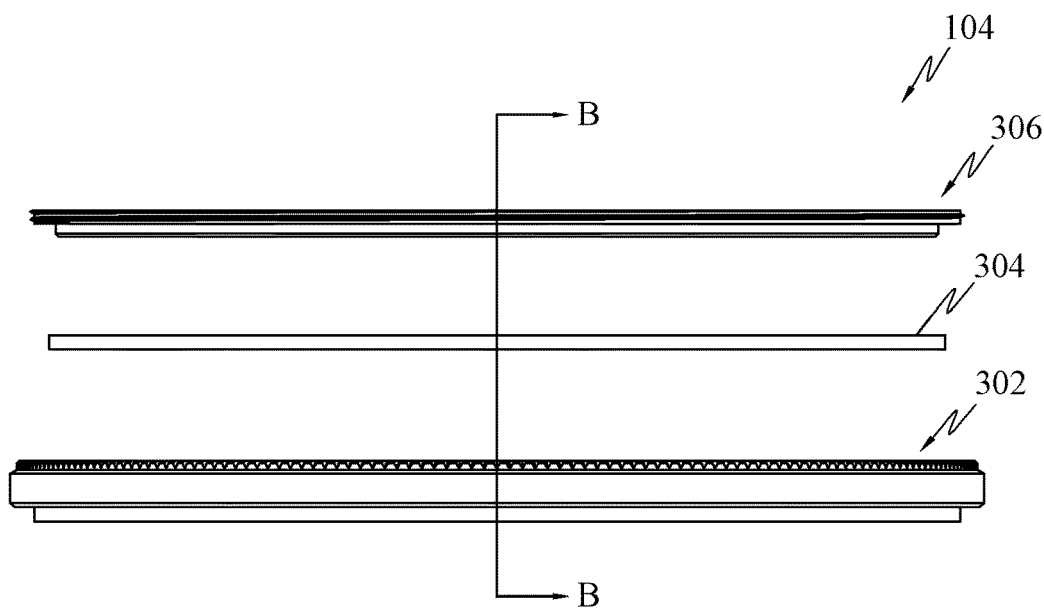
FIG. 3A illustrates an exploded side view of a filter assembly 104 of the apparatus 100, in accordance with an embodiment.
Figure 3B:
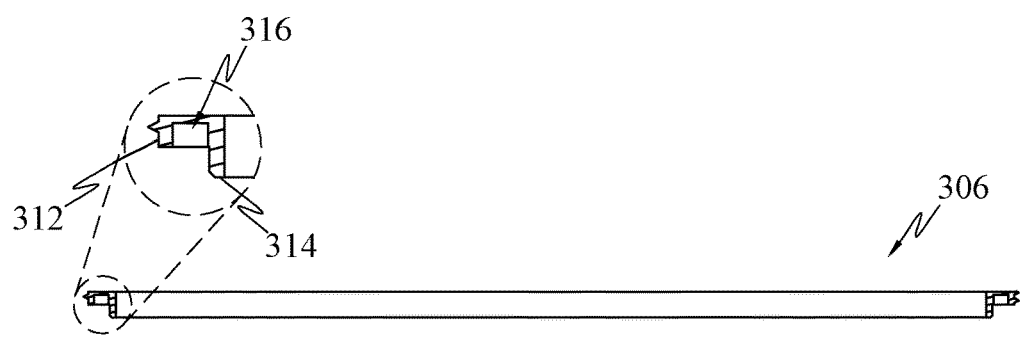
FIG. 3B illustrates cross section of the exploded view of the filter assembly 104 taken along the line B-B, in accordance with an embodiment.
Figure 3B:
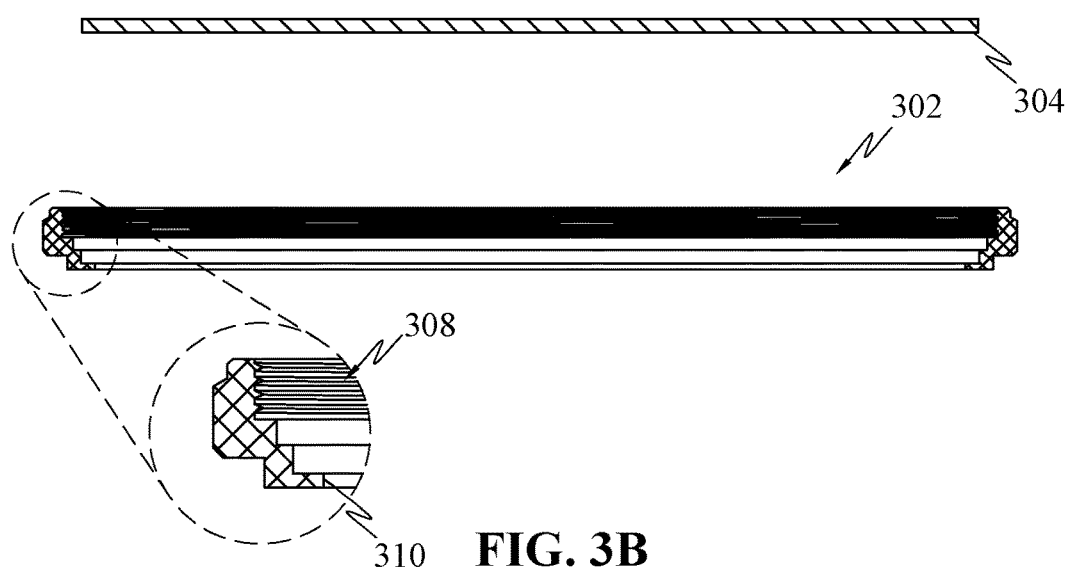
Figure 3C:
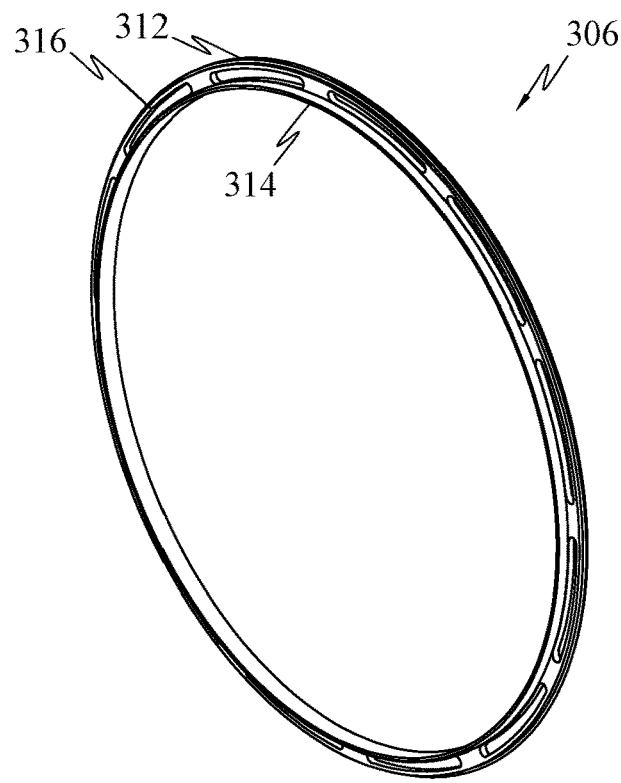
FIG. 3C illustrates isometric view of a second engagement member 306 of the filter assembly 102, in accordance with an embodiment.

Referring to FIGS. 3A-3C, the filter assembly 104 may comprise a second main frame 302, a filter 304 and a second engagement member 306, in accordance with an embodiment. The second main frame 302 comprises of a third threaded portion 308 defining internal threads. The second main frame 302 further comprises of a second structure 310 protruding radially inwards.

In an embodiment, the second engagement member 306 comprises of a third leg 312 and a fourth leg 314, wherein at least one slot 316 is defined between the third leg 312 and the fourth leg 314. The second engagement member 306 comprises of a second set of one or more magnets (not shown in figures). The second set of one or more magnets may be configured to be received by the slot 316 defined between the third leg 312 and the fourth leg 314. The second set of one or more magnets may be engaged within the slot 316 by any know adhesives. The third leg 312 of the second engagement member 306 comprises of external threads.

In an embodiment, the filter 304 may be configured to be received over the second structure 310 of the second main frame 302 that protrude radially inwards. The filter 304 may rest on the second structure 310. The external threads on the third leg 312 of the second engagement member 306 may be configured to be received by the third threaded portion 308 of the second main frame 302 of the filter 304 assembly 104, thereby engaging the second engagement member 306 onto the second main frame 302. The third leg 312 of the second engagement member 306 extend towards the filter 304 and may be configured to limit the displacement of the filter 304. The second main frame 302 comprises of at least a portion of the third threaded portion 308 protruding over the second engagement member 306.

In an embodiment, the filter 304 configured to rest on the first structure 212, or the second structure 310, may be replaced by disengaging the first engagement member 206 or the second engagement member 306 from the first main frame 202 or the second main frame 302, respectively.

In an alternate embodiment, the filter 304 and the first filter 204 may be permanently engaged to a first main frame 202 and a second main frame 302 respectively, using any known adhesives.

Figure 4:
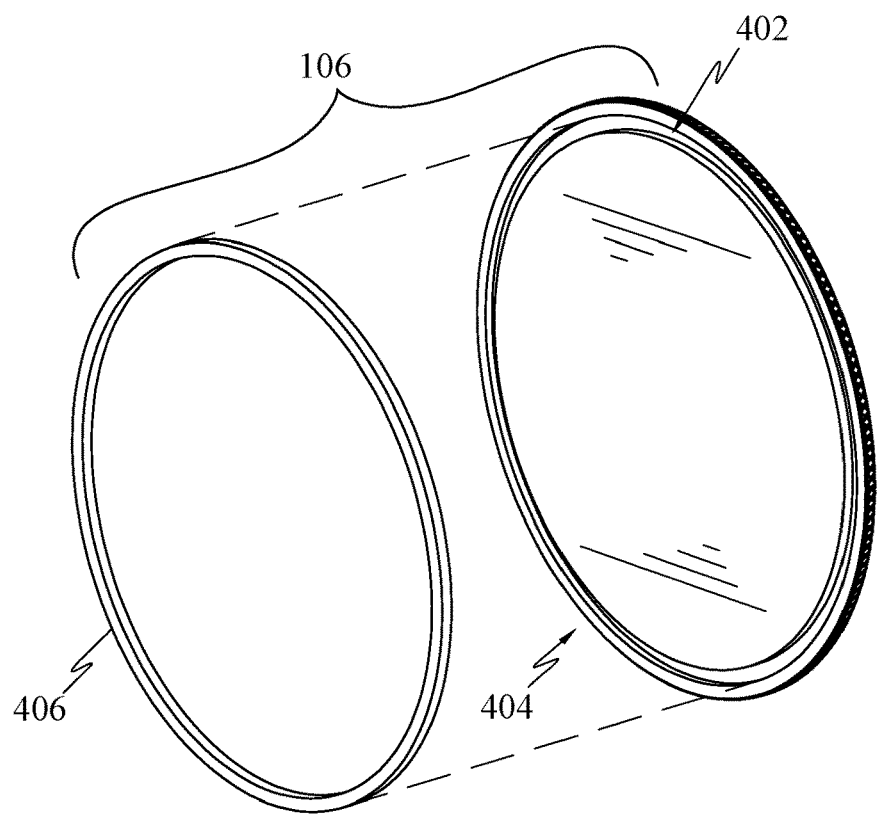
FIG. 4 illustrates exploded view of a lens cover of the apparatus 100, in accordance with an embodiment.

In an embodiment, referring to FIG. 4, the lens cover 106 may be provided with a groove 402 on a rear side 404. The groove 402 may be configured to receive a ferro magnetic material 406. The ferro magnetic material 406 may extend away from the rear side 404 of the lens cover 106 such that the ferro magnetic material 406 may be received by the portion of the first main frame 202 protruding over the first engagement member 206 of the of the adapter assembly 102 or portion of the second main frame 302 protruding over the second engagement member 306 of the filter assembly 104. The ferro magnetic material 406 may be engaged within the groove 402 by any known adhesives.

Figure 5A:
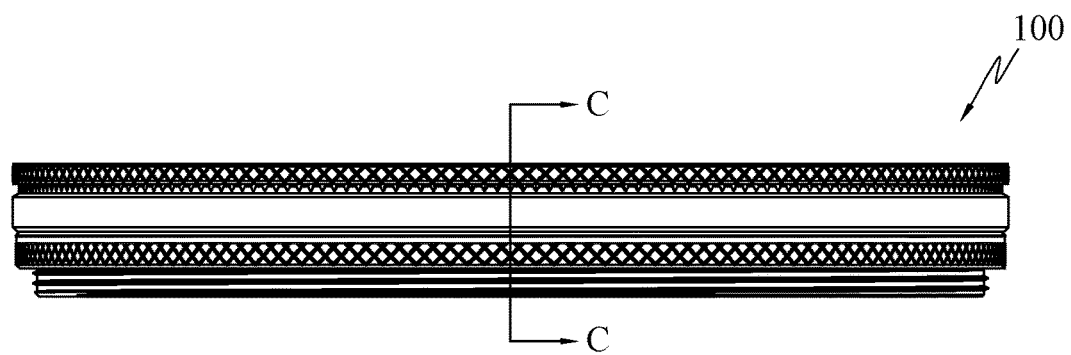
FIG. 5A illustrates side view of the assembled apparatus 100 configured to be mounted onto a lens 12 of a photographic device 10, in accordance with an embodiment.
Figure 5B:
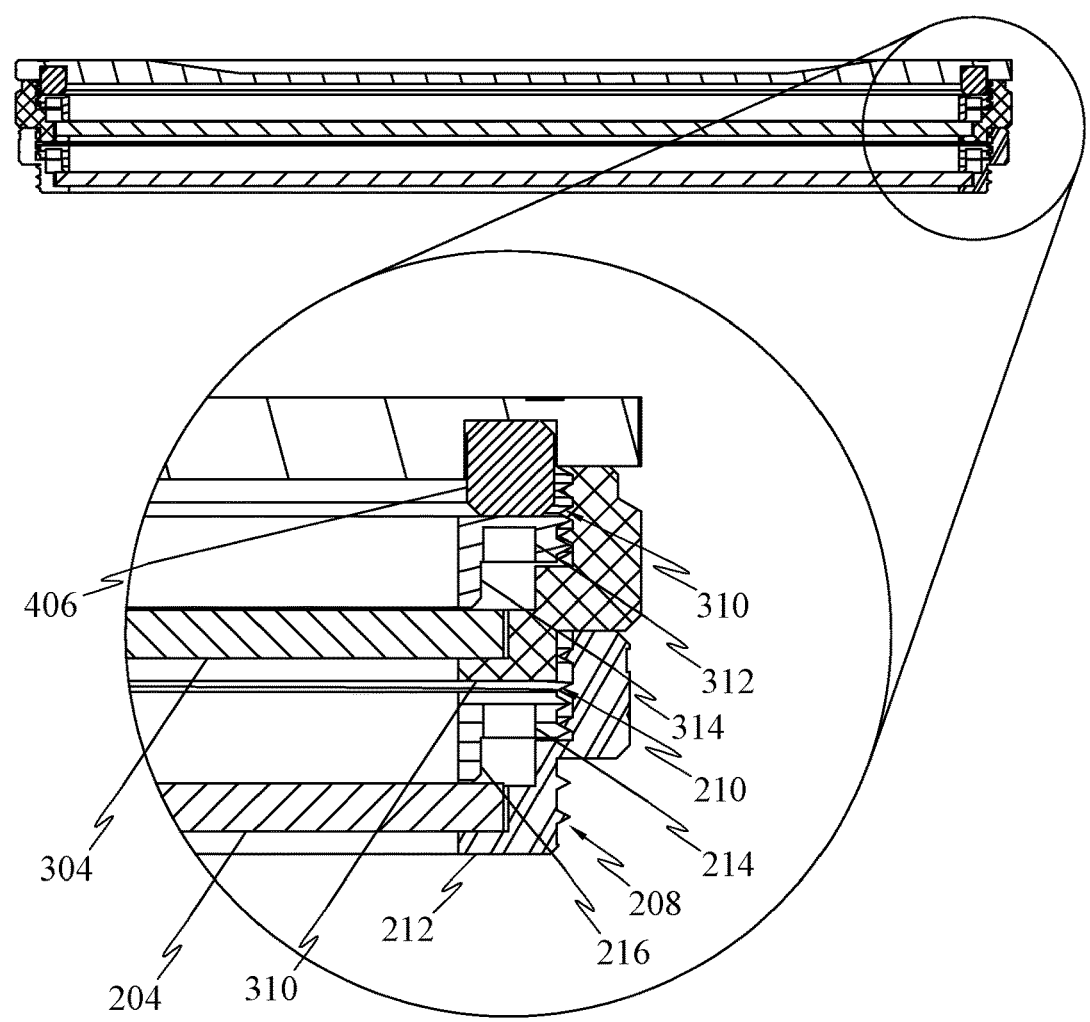
FIG. 5B illustrates cross section of the assembled apparatus 100 taken along the line C-C, in accordance with an embodiment.

In an embodiment, referring to FIGS. 5A-5B, the first threaded portion 208 of the first main frame 202 of the adapter assembly 102 may be received by the lens 12 of the photographic device 12, thereby allowing the adapter assembly 102 to be mounted onto the photographic device 12. The second threaded portion 210 protruding over the first engagement member 206 (comprising legs 214 and 216) may be configured to receive at least a portion of the second structure 310 of the filter assembly 104, thereby allowing the filter assembly 104 to be mounted onto the adapter assembly 102. The ferro magnetic material 406 on the lens 12 cover may be received by the portion of the second main frame 302 protruding over the second engagement member 306 of the filter assembly 104, thereby allowing the lens cover 106 to be received by the filter assembly 104.

In an embodiment, the second structure 310 may be received into the first main frame 202 and over the first engagement member 206, wherein the second structure 310 may be attracted to the first engagement member 206. The second structure 310 may be dimensioned to ensure a seal between the second main frame 302 and an anterior facing rim of the first main frame 202 when the filter assembly 104 is mounted onto the adapter assembly 102, thereby preventing entry and accumulation of dust into the apparatus 100.

In an embodiment, a plurality of filter assemblies 104 may be stacked on the adapter assembly 102, thereby allowing mounting of multiple filters at any given instance.

In an alternate embodiment, the second threaded portion 210 protruding over the first engagement member 206 or the third threaded portion 310 protruding over the second engagement member 306 may be configured to receive at least a portion of a conventional filter assembly 104 comprising external threads.

In an alternate embodiment, the adapter assembly 102 may be mechanically coupled to the lens 12 of the photographic device 12. The filter assembly 104 may in turn be magnetically coupled to the adapter assembly 102. A conventional filter defining external threads may then be mechanically coupled to the filter assembly 104, thereby allowing conventional filters and magnetic filters to be coupled onto a single setup.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. An apparatus for detachably mounting filters onto a lens of a photographic device, the apparatus comprising:
    an adapter assembly comprising:
        a first main frame comprising:
            a first threaded portion defining external threads for engagement with the lens;
            a second threaded portion defining internal threads; and
            a first structure disposed towards the lens of the camera, wherein the first structure protrudes radially inwards;
        a first filter received by the first main frame, wherein the first filter rests over the first structure; and
        a first engagement member comprising:
            a first leg and a second leg, wherein the first leg extends in a longitudinal direction to terminate at a first edge and the second leg extends in a longitudinal direction to terminate at a second edge;
            a lateral member formed between an edge opposite to the first edge of the first leg and an edge opposite to the second edge of the second leg to define a first slot between the first leg and the second leg, wherein the second edge of the second leg interfaces with the first filter to limit the displacement of the first filter; and
            a first set of one or more magnets received by the first slot are disposed towards the second threaded portion, wherein at least a portion of the second threaded portion protrudes over the first engagement member; and
    a filter assembly comprising:
        a second main frame comprising:
            a third threaded portion defining internal threads; and
            a second structure protruding radially inwards;
        a filter received by the second main frame, wherein the filter rests over the second structure; and
        a second engagement member disposed over the filter to limit displacement of the filter, the second engagement member comprising a second set of one or more magnets disposed towards the third threaded portion, wherein at least a portion of the third threaded portion protrudes over the second engagement member, wherein:
            the second structure is received into the first main frame and over the first engagement member, wherein the second structure is magnetically attracted to the first engagement member to interface with the first engagement member, wherein the second structure is dimensioned to ensure a seal is created between the second main frame and the first main frame at an anterior facing rim of the first main frame.

2. The apparatus of claim 1, wherein the first engagement member defines external threads configured to be received by the internal threads of the second threaded portion of the first main frame.

3. The apparatus of claim 2, wherein,
    the first leg defines the external threads of the first engagement member.

4. The apparatus of claim 1, wherein the portion of the second threaded portion protruding over the first engagement member is configured to receive a conventional filter assembly, which is provided with threaded configuration for engagement with preceding conventional filter assembly.

5. The apparatus of claim 1, wherein the second threaded portion is stacked over the first threaded portion.

6. The apparatus of claim 1, wherein the second engagement member defines external threads configured to be received by the internal threads of the third threaded portion of the second main frame.

7. The apparatus of claim 6, wherein the second engagement member defines at least one slot, wherein the slot receives the second set of one or more magnets.

8. The apparatus of claim 7, wherein the second engagement member comprises a third leg and a fourth leg, wherein,
    the slot is defined between the third leg and the fourth leg;
    the third leg defines the external threads of the second engagement member; and
    the fourth leg extends towards the filter and limits displacement of the filter.

9. The apparatus of claim 1, wherein the portion of the third threaded portion protruding over the second engagement member is configured to receive a conventional filter assembly, which is provided with threaded configuration for engagement with preceding conventional filter assembly.

10. The apparatus of claim 1, further comprises a lens cover defining a groove receiving a ferro magnetic material to magnetically couple the lens cover to the first or the second set of one or more magnets.

11. The apparatus of claim 1, wherein,
    the second engagement member defines external threads configured to be received by the internal threads of the third threaded portion of the second main frame;

the second engagement member limits displacement of the filter;

the filter is disengageable from the filter assembly by disengaging the second engagement member from the second main frame.

12. The apparatus of claim 1, wherein, the portion of the second threaded portion protruding over the first engagement member is configured to receive at least a portion of the second structure of the filter assembly.

* * * * *